United States Patent
Mochizuki

(10) Patent No.: US 7,185,053 B1
(45) Date of Patent: Feb. 27, 2007

(54) DATA COMMUNICATION APPARATUS AND METHOD FOR TRANSMITTING DATA BASED UPON A RECEIVED INSTRUCTION

(75) Inventor: Akihito Mochizuki, Narashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 585 days.

(21) Appl. No.: 09/588,495

(22) Filed: Jun. 7, 2000

Related U.S. Application Data

(63) Continuation of application No. 09/025,184, filed on Feb. 18, 1998, now Pat. No. 6,101,526.

(30) Foreign Application Priority Data

Feb. 19, 1997 (JP) ................................. 9-035129

(51) Int. Cl.
*G06F 15/16* (2006.01)
(52) U.S. Cl. ...................... 709/204; 709/205; 709/217; 709/227
(58) Field of Classification Search ........ 709/200–206, 709/217–219, 223–224, 227–229, 231–233, 709/238–239; 358/402–403, 440, 442
See application file for complete search history.

(56) References Cited

U.S. PATENT DOCUMENTS

| | | | | |
|---|---|---|---|---|
| 5,708,780 A | * | 1/1998 | Levergood et al. | 709/229 |
| 5,790,793 A | * | 8/1998 | Higley | 709/218 |
| 5,793,972 A | * | 8/1998 | Shane | 709/219 |
| 5,812,278 A | * | 9/1998 | Toyoda et al. | 358/402 |
| 5,812,769 A | * | 9/1998 | Graber et al. | 709/218 |
| 5,841,977 A | * | 11/1998 | Ishizaki et al. | 709/204 |
| 5,841,982 A | * | 11/1998 | Brouwer et al. | 709/224 |
| 5,881,233 A | * | 3/1999 | Toyoda et al. | 709/233 |
| 6,134,584 A | * | 10/2000 | Chang et al. | 709/219 |
| 6,360,254 B1 | * | 3/2002 | Linden et al. | 709/219 |
| 6,542,936 B1 | * | 4/2003 | Mayle et al. | 709/203 |

FOREIGN PATENT DOCUMENTS

| | | |
|---|---|---|
| JP | 02-172348 | 7/1990 |
| JP | 06-311321 | 11/1994 |
| JP | 07-191968 | 7/1995 |
| JP | 08-032617 | 2/1996 |

(Continued)

OTHER PUBLICATIONS

Notification of the First Office Action dated May 25, 2001, issued by The Patent Office of the People's Republic of China, in Chinese lagnuage.

(Continued)

*Primary Examiner*—Bharat Barot
(74) *Attorney, Agent, or Firm*—Morgan & Finnegan, LLP

(57) ABSTRACT

A data communication device and method for reducing a load on a mail server. The device transmits image data from an electronic mail without using the electronic mail itself. The device functions by inputting image data, storing the image data, transmitting non-image data relating to the image data to a destination by electronic mail, recognizing an instruction received from that destination, and transmitting the stored image data without using electronic mail, but rather in a way requested in the instruction.

9 Claims, 5 Drawing Sheets

FOREIGN PATENT DOCUMENTS

| | | |
|---|---|---|
| JP | 08-286847 | 11/1996 |
| JP | 09-034772 | 2/1997 |
| WO | WO 96/34341 | 10/1996 |

OTHER PUBLICATIONS

English Translation of the Notification of the First Office Action dated May 25, 2001, issued by The Patent Office of the People's Republic of China.
Abstract for Japanese Patent Application Laid-Open No. 08-032617.
Abstract for Japanese Patent Application Laid-Open No. 07-191968.
Abstract for Japanese Patent Application Laid-Open No. 06-311321.
Abstract for Japanese Patent Application Laid-Open No. 08-286847.
Abstract for Japanese Patent Application Laid-Open No. 02-172348.
Abstract for Japanese Patent Application Laid-Open No. 09-034772.
Office Action for counterpart Japanese application No. 09-035129.

* cited by examiner

DATA COMMUNICATION APPARATUS AND METHOD FOR TRANSMITTING DATA BASED UPON A RECEIVED INSTRUCTION

This is a continuation of application Ser. No. 09/025,184, filed Feb. 18, 1998 now U.S. Pat. No. 6,202,526.

BACKGROUND OF THE INVENTION

1. Field of the Invention

The present invention relates to data communication apparatus and method for effectively communicating image data.

2. Related Background Art

Conventionally, in image communication to transmit and receive image information between terminals, especially, when it aims to transmit the image information to a specified individual, a facsimile apparatus for transmitting and receiving the image information based on a dedicated protocol by using mainly a public line, a method for adding an image file to an electronic mail transmitted between computer terminals connected to a network, or the like has been utilized.

Further, although it does not aim to transmit the image information to the specified individual, a WWW (World Wide Web) system utilizing a computer communication network becomes noticeable since an internet has been popularized. Like an internet application such as the electronic mail or the like, such the WWW system is a client/server system based on a communication protocol called a TCP/IP (Transmission Control Protocol/Internet Protocol). Further, such the WWW system has been developed as an information retrieval/provision system which can be realized by communicating not only the image information but also data such as text data, voice data, animation data and the like handled in a computer, between a client application having a GUI (Graphical User Interface) called a WWW browser and a WWW server application.

However, in case of utilizing the image communication performed by the above conventional facsimile apparatus, a reception side can not confirm or know what kind of image was transmitted until the transmitted image is actually printed. For this reason, there has been a problem that, even if the transmitted image is unnecessary information for the reception side, an operator at the reception side can not previously confirm contents of such the information to cancel unnecessary reception. Further, the facsimile apparatus tends to be utilized in common by plural operators, there is a premise that the image is transmitted between the two facsimile apparatuses, and the image is transmitted based on one-sided intention of the operator at the transmitter-side facsimile apparatus. Therefore, there have been problems that it is not assured that the transmitted image certainly reaches the operator (individual) at an intended destination, and also there is some fear that contents of the transmitted image are seen by a person other than the operator at the destination. Furthermore, when the operator at the transmission side aims to cause the operator at the destination to confirm necessity or unnecessity of the transmitted image, there has been inconvenience that the operator at the transmitter side must utilize other means, e.g., a telephone or the like, for such confirmation.

On the other hand, in such the conventional method as the image file is added to the electronic mail transmitted between the computer terminals connected to the network, since the electronic mail essentially intended for the individual is utilized, it is possible to solve the above-described problem by securing certainty that the image is transmitted to the operator at the destination. However, like the case where the facsimile apparatus is used, if the communication is not completed, the operator on the reception side can not confirm the received image. Therefore, there has been a problem that, even if the transmitted information is unnecessary for the reception side, the operator on the reception side can not previously confirm it and thus can not previously avoid receiving it. Further, since the electronic mail essentially aims to transmit and receive text data, if such the high-resolution and high-quality image file as used in the printing is added to the electronic mail, the data of which amount is significantly large must be transmitted, thereby seriously loading an electronic mail server. Furthermore, in order to display such the image file on a display device of the reception terminal, there has been a problem that a display application software is necessary, and a large-capacity memory is also necessary, thereby seriously loading a CPU.

SUMMARY OF THE INVENTION

An object of the present invention is to provide data communication apparatus and method which solve or eliminate the above-described conventional problems.

An another object of the present invention is to provide data communication apparatus and method which can transmit image information to a destination without increasing a load to a mail server.

A still another object of the present invention is to provide image communication apparatus and method which can transmit image data on the basis of an instruction from a reception side.

A still another object of the present invention is to provide image communication apparatus and method which can switch a communication method according to communication contents.

The above and other objects, features, and advantages of the present invention will be apparent from the following detailed description and the appended claims in conjunction with the accompanying drawings.

BRIEF DESCRIPTION OF THE DRAWINGS

FIG. 3 is a flow chart showing a process for transmitting an electronic mail by an image communication apparatus a;

DETAILED DESCRIPTION OF THE PREFERRED EMBODIMENT

Hereinafter, an embodiment of the present invention will be explained in detail with reference to the accompanying drawings.

Figure 1:
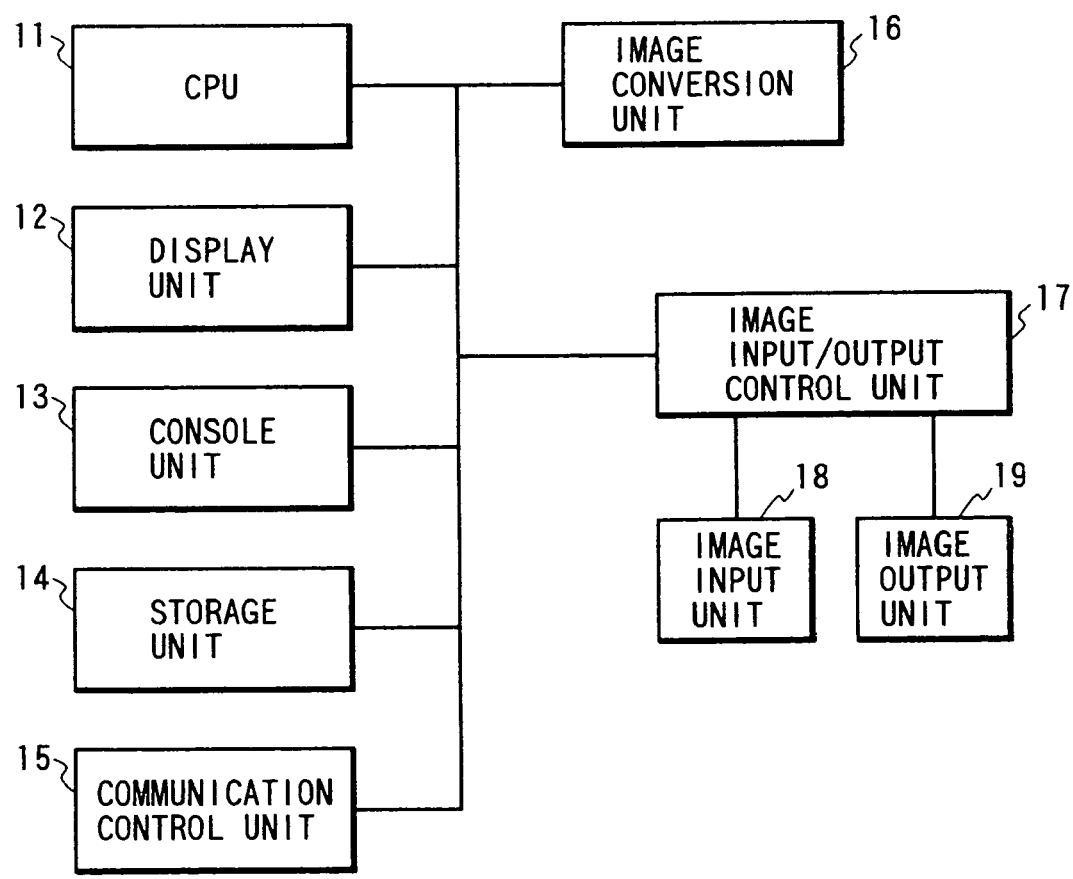
FIG. 1 is a block diagram showing schematic structure of an image communication apparatus according to an embodiment of the present invention.

FIG. 1 is a block diagram showing structure of an image communication apparatus according to the present embodiment.

In FIG. 1, reference numeral 11 denotes a CPU (central processing unit) which controls each unit in the apparatus based on programs stored in a ROM (read-only memory). Reference numeral 12 denotes a display unit which performs various displaying. For example, the display unit 12 displays a state of the apparatus, a screen for urging an operator to perform various operations, and the like. Reference numeral 13 denotes a console unit by which the operator inputs instructions according to the displaying on the display unit 12. The console unit 13 may comprise any input device such as a key input button, a pointing device (e.g., mouse), a touch panel or the like. Reference numeral 14 denotes a storage unit which stores data representing an input image or the like as a file. Reference numeral 15 denotes a communication control unit which controls connection of the apparatus to an external network.

An image input unit 18 and an image output unit 19 are connected to an image input/output control unit 17 and controlled according to instructions from the CPU 11. An image conversion unit 16 converts image quality such as resolution or the like.

Figure 2:
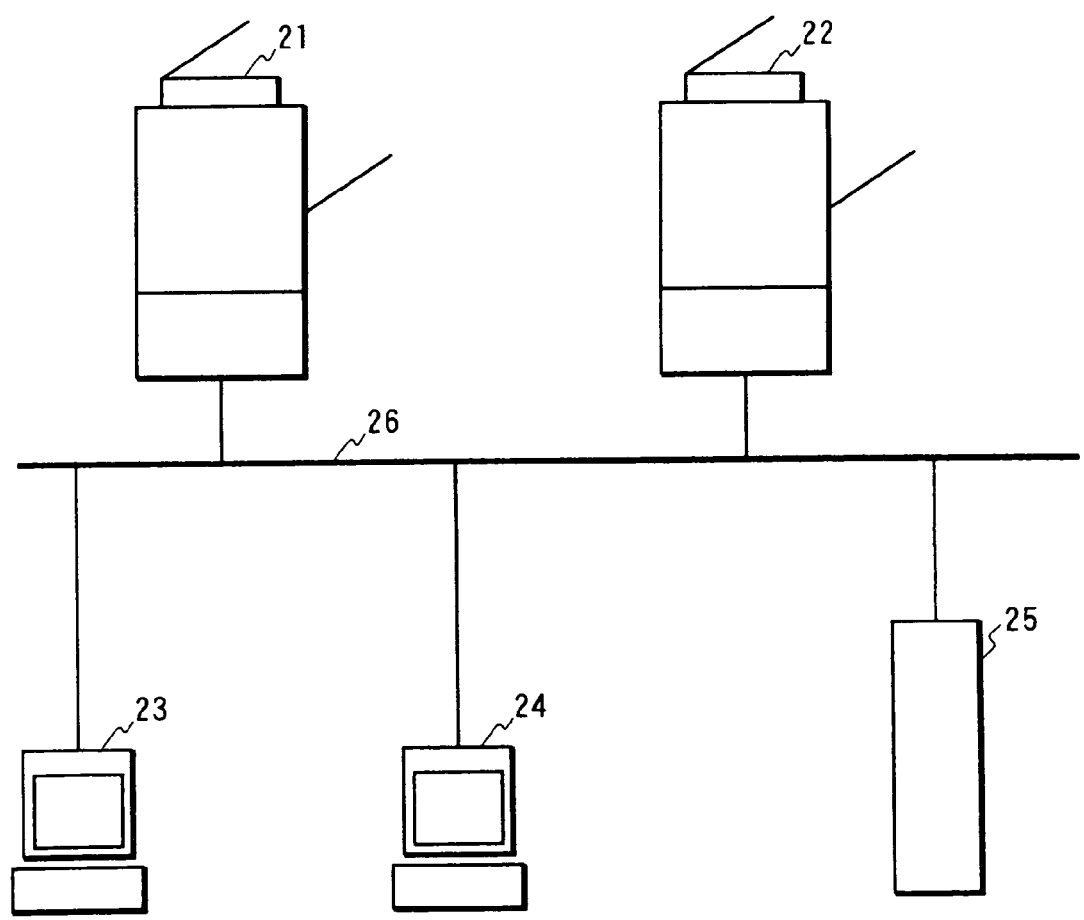
FIG. 2 is a view showing structure of an image communication system according to the embodiment of the present invention.

FIG. 2 is a view showing system structure of an image communication system to which the image communication apparatus according to the present embodiment is connected.

In FIG. 2, reference numerals 21 and 22 respectively denote the image communication apparatuses shown in FIG. 1. To simplify the explanation, it is assumed that the apparatus 21 is handled as an image communication apparatus a to be used for transmitting the data and the apparatus 22 is handled as an image communication apparatus b to be used for outputting a received image.

Each of the image communication apparatuses 21 and 22 has an image input/output function, a network communication function based on TCP/IP (Transmission Control Protocol/Internet Protocol) connection, a WWW (World Wide Web) server function, and an electronic mail transmission/reception function. Reference numeral 23 denotes a terminal which has been registered as a reply destination used when the image transmission is performed by the image communication apparatus a, and reference numeral 24 is a terminal which has been registered as an image transmission destination to which the image transmission is performed from the image communication apparatus a. These terminals are computer terminals (including CPU, memory, display unit and the like) which are connected to a network 26. Further, reference numeral 25 denotes a mail server which provides electronic mail services to the terminals respectively connected to the network 26. The apparatuses 21 and 22 and the terminals 23 and 24 are all connected to others by means of the network 26. In this network 26, if each apparatus or terminal is connected based on the TCP/IP, they may be connected to others through any line and/or any protocol conversion on the way.

Subsequently, the operation of the image communication apparatus of such the structure as described above in the present embodiment will be explained in detail with reference to flow charts shown in FIGS. 3 to 5. These flow charts correspond to the control flows which are performed by the CPU 11 on the basis of program data stored in the memory of the apparatus.

Figure 3:
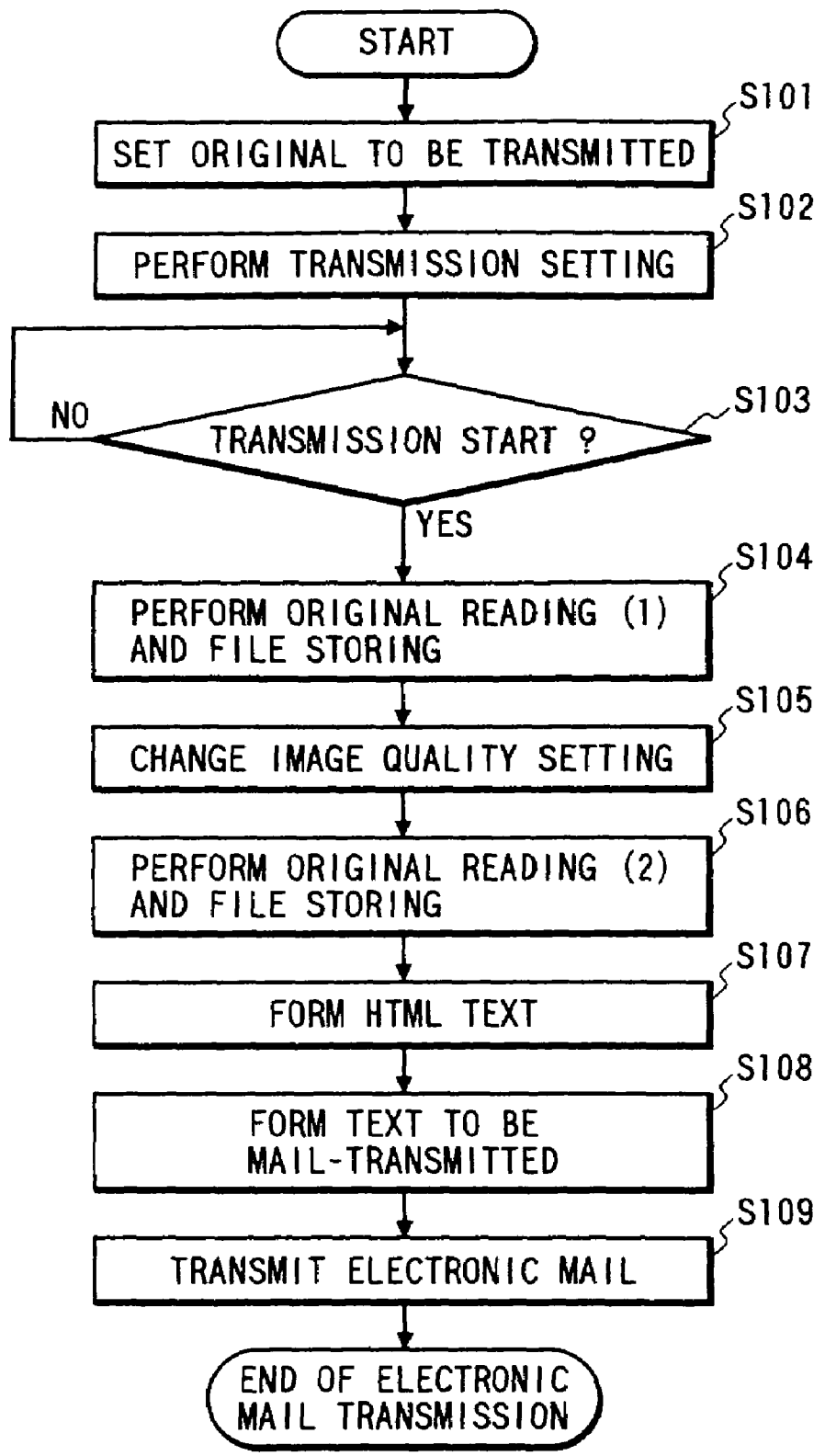

FIG. 3 is the flow chart showing the operation that an operator of the image communication apparatus a performs the transmission operation and thus an electronic mail is transmitted to a transmission destination.

In FIG. 3, in a step S101, it is initially recognized that an original to be transmitted to the image input unit 18 has been set by the operator. Then, in a step S102, it is further recognized the transmission destination and an instruction reply destination which have been set by the operator from the console unit 13 according to guidance displayed on the display unit 12. At this time, it is possible to add previously prepared fixed-form text and/or comment by operator's input operation or preliminary setting. After confirming the input setting, the flow advances to a step S103.

In the step S103, it waits for key inputting to start the transmission. When it is instructed by the operator from the console unit 13 to start the transmission, the flow advances to a step S104. In the step S104, the image on the original to be transmitted which has been set from the image input unit 18 connected to the image input/output control unit 17 is read with a first image quality, the obtained image data is stored as an image file in the storage unit 14, and then the flow advances to a step S105. In the step S105, the setting is changed to store the image file based on a second image quality of which resolution and color reproducibility are different from those of the first image quality. According to the changed setting, in a step S106, it is instructed to store the image file based on the second image quality. In this case, the original to be transmitted may be again read from the image input unit 18 to obtain the image data of the second image quality, or the image file of the second image quality may be formed by converting the data of the image file based on the first image quality with the image conversion unit 16. In any case, the image files based on the two kinds of image qualities are formed from the identical image. The image files of the different image qualities formed and stored in such the manner as above are utilized as a display image (coarse image of which data amount is small) and a print image (high-quality image). The display image is displayed on a terminal on a receiver side and used to confirm the received image, and the print image is transferred as print data after the receiver side confirmed such the display image. It is possible to prepare the plural display images and the plural print images to enable providing them according to display capability and print capability of the terminal on the receiver side or the image communication apparatus used for the image outputting. Further, the display image and the print image can be appropriately converted by the image conversion unit 16. By such the processes, when the image files of the respective image qualities are correlated with the information set in the step S102 and then stored into the storage unit 14, the flow advances to a step S107. In the step S107, locations of the display image files and the print image files formed and stored till that time are described in an HTML (HyperText Markup Language) and then stored in the storage unit 14.

The locations of such the HTML file and the display data are described in a URL (Uniform Resource Locater) which integratively describes information resources on an internet. A general format of the URL to be utilized in a WWW system is shown as "resource_type://host.domain/path".

In this case, the format "resource_type" shows the used protocol or services, and designates an http (hypertext transfer protocol) in the image communication apparatus of the present embodiment. In other cases, although such a protocol as "gopher", "ftp", "nntp" or the like may be designated, the concrete explanation thereof is omitted. Further, the format "host.domain" shows an address of the server on the internet to be accessed, and is designated in an IP address format or a domain address format. In the image communication apparatus of the present embodiment, the IP address of the WWW server is designated. Furthermore, the format "path" shows a position of the file in the server. For example, in the image communication apparatus of the present embodiment, the location of the HTML file is described as "http://Server_ip_address/□□□/xxx.html". Further, the location of the display data for confirming the stored transmission image is described as "<IMG SRC = "http://Server_ip_address/□□□/○○○.ΔΔΔ">" in an HTML tag system.

In this case, the extension "ΔΔΔ" generally uses a compression image file format such as GIF, JPG or the like. Such the extension is interpreted by using a WWW browser being the client application in the WWW system. When demanding the image file such as "○○○.ΔΔΔ" from a WWW server of the image communication apparatus, the WWW browser can display such the image file.

In a step S108, the transmission text (i.e., text to be transmitted) including the transmission destination, the instruction reply destination, the fixed-form text, the comment input and the like set in the step S102 is formed based on a known general-purpose electronic mail format. Further, the location of the HTML file formed and stored in the step S107 is added to the transmission text of the electronic mail. In a step S109, the transmission text of the electronic mail formed in such the manner as above is transmitted to the destination designated based on the transmission function of the electronic mail included in the image transmission apparatus a, as the electronic mail. Then, the transmitted electronic mail is sent to the transmission terminal 24 through the mail server 25.

Subsequently, with reference to FIG. 4, it will be explained in detail the operation that the receiver at the transmission destination receives the electronic mail, confirms the display image and provides various instructions to the image communication apparatus a at the transmission source. This flow chart corresponds to the control flow which is performed by the CPU on the basis of a program installed in the memory of the terminal 24 at the transmission destination.

Figure 4:
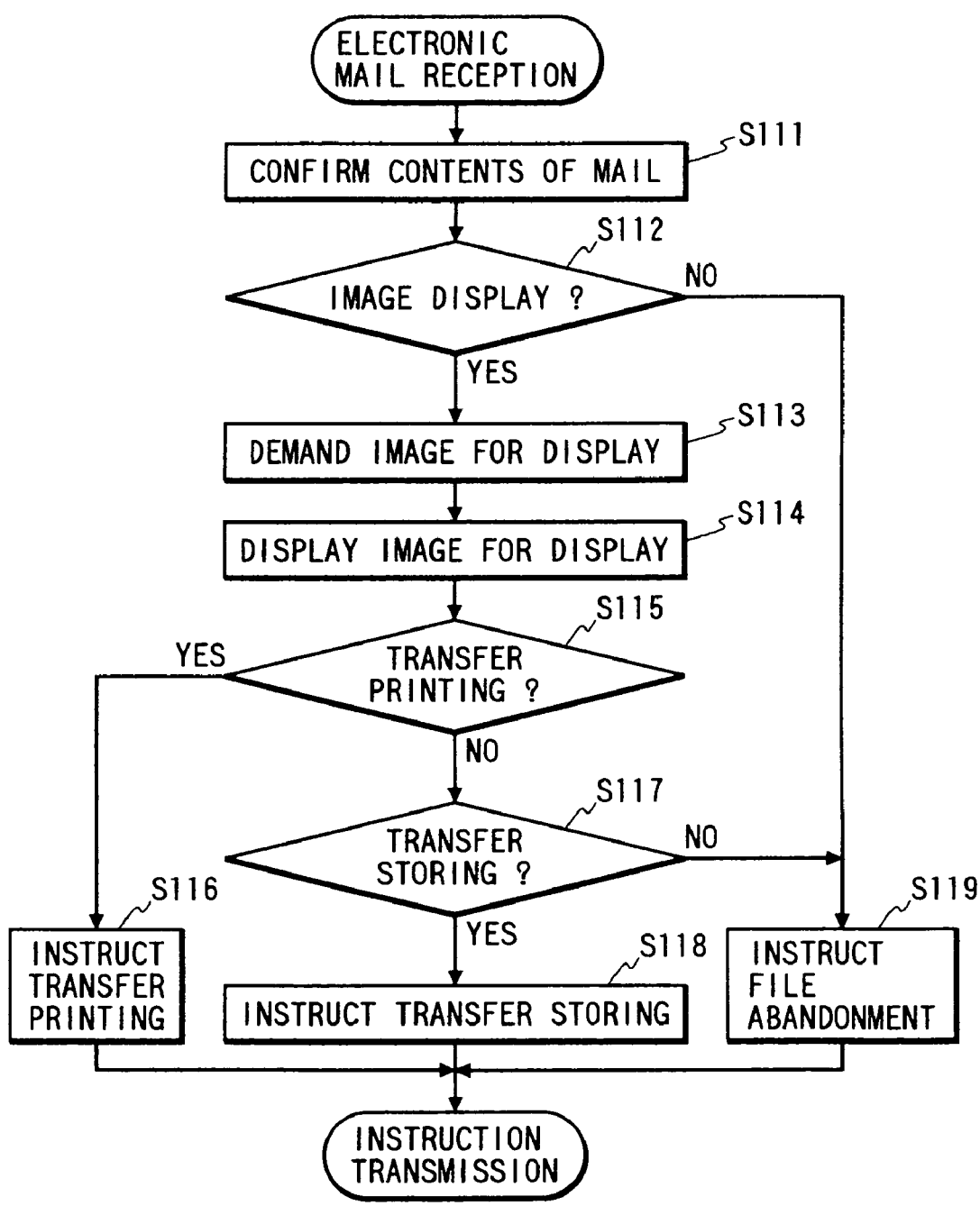
FIG. 4 is a flow chart showing a process performed on the electronic mail received by a terminal 24 at a transmission destination.

In FIG. 4, initially in a step S111, the receiver who received the electronic mail causes the display unit to display the text contents of the received electronic mail and confirms the displayed contents, by using an electronic mail client application. Such the contents of the electronic mail include information representing that this electronic mail was sent by such special image transmission service as described in the present embodiment, a message to urge the operator to access the added URL by using the WWW browser, information concerning the transmitter, a comment from the transmitter and the like, but the contents described in the electronic mail are not limited thereto. Such the contents can be implicitly managed depending on circumstance.

In a step S112, it is judged whether or not the receiver of the electronic mail instructs (by clicking the URL portion described in the HTML text with use of the pointing device or the like) to confirm the image on the basis of the described contents. If there is the receiver's instruction, the flow advances to a step S113. In this case, if the electronic mail client application having a function to initiate the WWW browser from the URL described in the text of the electronic mail is utilized, it is possible to immediately confirm the image. However, even if the electronic mail client application not having such the function is utilized, it is possible to confirm the image by initiating the WWW browser independently.

In the step S113, the WWW browser demands, from the image communication apparatus a, the HTML file which was formed and stored in the image communication apparatus a in the step S107 and is represented by the above URL. Since the image communication apparatus a has a WWW server function, the apparatus a supplies responsive to the demand from the WWW browser the designated HTML file to such the WWW browser. Further, the WWW browser analyzes the supplied HTML file. Then, according to the URL in which the display image described in the text and being a source object to be displayed has been described, the WWW browser again demands to display such the display image.

In a step S114, since the display image demanded by the WWW browser is supplied, the WWW browser causes the display unit of the terminal 24 to display the supplied display image. As a result, the receiver of the electronic mail can confirm, as a visible image, outline of the image transmitted from the image communication apparatus a on the display unit of the transmission destination terminal 24 logged in by the user at the destination.

After the confirmation of the display image by the receiver of the electronic mail, the flow further advances to a step S115. In an image communication system according to the present embodiment, since the image is displayed on the transmission destination terminal 24, the operator can instruct the apparatus to print out the high-quality print image simultaneously with the confirmation of the image. In the step S115, the displaying to instruct whether or not the print image is to be printed out is performed on the same screen as that for the display image, and the instructed contents responsive thereto are transmitted to the image communication apparatus a.

The function included in the WWW browser can be utilized in such an instruction and transmission method. That is, the WWW system includes a CGI (Common Gateway Interface) for transferring the input from the client (i.e., WWW browser) to the server to process such the input based on an external program. For example, in a case where an object (text, bit map data or the like) for instructing the printout of the print image is buried in the HTML text displayed on the WWW browser and it is set that the previously prepared instruction contents are transferred to the server if the object is selected, it is possible that the server which received the transferred instruction analyzes the instruction contents and initiates the program to transfer and print the print data. Further, by utilizing the CGI, it becomes possible to transfer not only the previously prepared instruction contents but also the data inputted by the operator. Therefore, by utilizing the data inputted by the operator, it becomes possible to instruct the system to transfer and print out the print image to not only the specific image communication apparatus but also the arbitrary image communication apparatus based on such the input data. In any case, the above instruction and transmission method is not limited to the method which utilizes the above CGI. That is, any instruction and transmission method may be used, if such the method is based on the application executable between the server (i.e., the image communication apparatus a) and the client (i.e., the terminal displaying the display image). If the printout of the print image is instructed in the step S115, the flow advances to a step S116 to transfer the instruction contents to the image communication apparatus a in the above-described instruction and transmission method.

If the operator does not instruct the apparatus to print out the print image in the step S115, the flow advances to a step S117. In the step S117, it is selected by the operator whether the image data of which printout is not instructed is not to be printed out but to be stored as the file after the print image was transferred, or the image data is to be abandoned or deleted. If it is selected to transfer and store the print image in the step S117, the flow advances to a step S118. On the other hand, if it is selected to abandon the print image, the flow advances to a step S119. In the steps S118 and S119, like the above-described print instruction, the instruction contents are transmitted to the image communication apparatus a.

Subsequently, with reference to the flow chart shown in FIG. 5, it will be explained in detail the operation that the image communication apparatus a receives the instruction contents from the receiver and analyzes the received contents, and then the process terminates.

Figure 5:
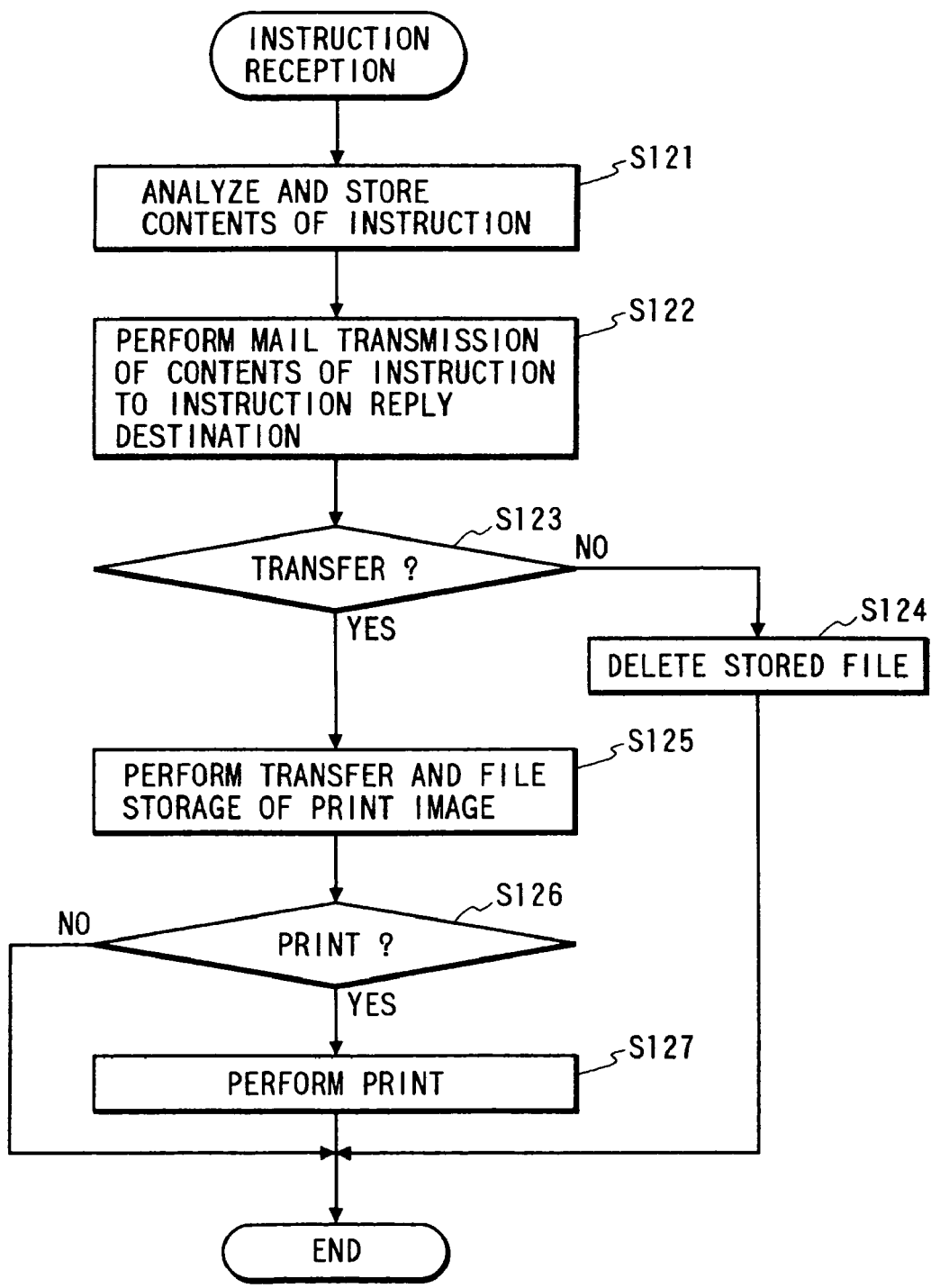
FIG. 5 is a flow chart showing a process as to handling of image data by the image communication apparatus.

In FIG. 5, initially in a step S121, the received instruction contents (either one of instructions in the steps S116, S118 and S119) are stored in the storage unit 14. After then, the flow advances to a step S122 to specify the setting on the transmission image in the step S102 performed at the image transmission time on the basis of the received instruction contents, and transfer such the instruction contents to the reply destination terminal 23 being the instruction reply destination on the basis of the instruction reply destination information. In this case, the transferring of the instruction contents to the instruction reply destination is realized by transmitting the electronic mail. The instruction reply destination which received the instruction contents through the electronic mail can confirm transmission destination's action (i.e., abandonment, storage, print) on the image transmitted from the image communication apparatus a on the basis of the displaying on the display unit of the terminal. For this reason, it becomes possible to confirm whether or not the transmitted image was confirmed by the transmission destination. Further, it becomes possible to confirm the instruction on the transmitted image sent from the partner (i.e., transmission destination). After transferring the instruction contents to the instruction reply destination, the flow advances to a step S123.

In the step S123, the received instruction contents are analyzed. If the contents instruct to abandon the image data, the flow advances to a step S124 to delete the image file stored in the storage unit 14, and then the process terminates. On the other hand, if the contents instruct to transfer and print the image data or transfer and store the image data, the flow advances to a step S125. In the step S125, the print image is transferred to the previously designated image communication apparatus or to the image communication apparatus based on the data inputted by the operator of the reply destination terminal 24. In this case, the data transferring from the image communication apparatus a to the image communication apparatus b and the data storing as the file are performed without using the mail server 25. When such the data transferring and the file storing terminate, the flow advances to a step S126. In the step S126, based on the instruction from the image communication apparatus a 21, the image communication apparatus b 22 judges whether or not the print image transferred and stored as the file is to be printed. If not printed, the process terminates as it is. On the other hand, if printed, the flow advances to a step S127, the print image is transferred from the storage unit 14 to the image input/output control unit 17 and then printed out by the image output unit 19. After then, the process terminates.

It should be noted that all the operations shown in the flow charts of FIGS. 3 to 5 are confirmed as a series of communication on the identical image by checking IDs.

As explained above, according to the present embodiment, by utilizing the WWW server function and the transmission/reception function of the electronic mail, the image files of plural image qualities are stored, the file for describing by the HTML text the location of the file suitable to display the image outline is generated from the stored image files, and the electronic mail in which the location of the HTML file was added to transmission guide information concerning the transfer image is transmitted to the electronic mail address at the designated destination. Therefore, the transmitter who transmits the image information from the image communication apparatus a can certainly transmit the information to the specific individual destination, and the receiver who received the electronic mail from the image communication apparatus a can display and confirm the outline of the transmitted display image on the computer terminal, e.g., the terminal 24, which received the electronic mail, by utilizing a WWW server and client system through the network.

Further, the instruction to the image file based on the operation by the receiver who received the electronic mail is received by a communication means, the image file of desired image quality is selected from among the stored image files according to the received instruction and is transferred to the designated image communication apparatus b, and then the image is outputted based on the transferred image file. Therefore, the image data is directly transferred between the image communication apparatuses on the basis of the judgment by the receiver who confirmed the image, whereby the image reproduced by the high-quality print image data can be transmitted without adding the large-capacity file data probably loading the electronic mail system and the reception terminal.

Furthermore, on the basis of the operation by the operator who received the electronic mail, the designated image communication apparatus b is instructed to output the image file of desired image quality the moment that this file is transferred to this apparatus, to store this image file without the outputting, or to abandon the stored image file. Therefore, it is possible to avoid the transferring of unnecessary information according to circumstances, and also it is possible to postpone the printing output according to secretion of information.

Furthermore, the instruction contents from the receiver of the electronic mail are stored, and the stored instruction contents are transmitted by means of the electronic mail to the destination previously designated by the operator on the transmission side, whereby the transmitted image can certainly reach the destination individual. Therefore, such the transmitted image can be utilized, when the terminal, e.g., the terminal 23, at the destination designated by the operator on the transmission side confirms that the image was confirmed by the operator himself on the reception side, and that the image was transferred and printed or the image was judged to be unnecessary and thus data abandonment was instructed.

The present invention may be applied to a system constituted by plural apparatuses (e.g., host computer, interface unit, reader, printer and the like) or to a system constituted by a single apparatus (e.g., copy machine or facsimile machine).

The invention employed by a method wherein program codes of a software to realize the functions of the above-described embodiment are supplied to a computer in an apparatus or a system connected to various devices so as to make the devices operative in order to realize the functions of the above-described embodiment and the various devices are operated in accordance with the programs stored in the computer (CPU or MPU) of the system or apparatus is also included in the scope of the present invention.

In such the case, the program codes themselves of the software realize the functions of the above-described embodiment and the program codes themselves and means for supplying the program codes to the computer, e.g., a storage medium in which the program codes have been stored, construct the present invention.

As such the storage medium to store the program codes, for example, a floppy disk, a hard disk, an optical disk, a magneto-optical disk, a CD-ROM, a magnetic tape, a non-volatile memory card, a ROM or the like can be used.

Also, in not only a case where the functions of the above-described embodiment are realized by executing the supplied program codes by the computer but also a case where the functions of the above-described embodiment are realized in cooperation with an OS (operating system) by which the program codes operate in the computer or another application software or the like, such the program codes are of course included in the scope of the present invention.

Further, of course, the present invention also includes a case where the supplied program codes are stored in a memory provided for a function expansion board of a computer or a function expansion unit connected to a computer and, after that, a CPU or the like provided for the function expansion board or the function expansion unit executes a part or all of the actual processes based on the instructions of the program codes, and the functions of the above-described embodiment are realized by such the processes.

As explained above, according to the present embodiment, since based on the contents of the electronic mail the image data is transmitted by using the means other than the electronic mail, the image data can be easily and certainly transmitted to the receiver without loading the mail server or the like.

The present invention has been described in connection with the above preferred embodiment. However, the present invention is not limited only to the above-described embodiment, but various modifications are possible without departing from the scope of the appended claims.

What is claimed is:

1. A data communication apparatus comprising:
   a first transmission unit, arranged to transmit a URL for specifying additional information to a transmission destination;
   a reception unit, arranged to receive a reply from the transmission destination for the URL transmitted by said first transmission unit;
   a generating unit, arranged to generate a markup language file including an object for causing the transmission destination to instruct to print an image corresponding the additional information;
   a second transmission unit, arranged to transmit the markup language file including the object generated by said generation unit based on a first reply received by said reception unit to the URL transmitted by said first transmission unit; and
   a printing unit, arranged to print the image corresponding to additional information based on a second reply received by said reception unit to the markup language file including the object transmitted by said second transmission unit.

2. An apparatus according to claim 1, wherein said second transmission unit transmits the additional information in a manner different from that of said first transmission unit.

3. An apparatus according to claim 1, wherein said second transmission unit transmits the additional information to a terminal different from a terminal to which the data was transmitted by said first transmission unit.

4. An apparatus according to claim 1, wherein a link to a location of the additional information is set in the data URL transmitted by said first transmission unit.

5. An apparatus according to claim 1, wherein a processed content based on the reply received by said reception unit is further transmitted to the transmission destination.

6. An apparatus according to claim 1, further comprising an input unit arranged to input image data, wherein the additional information is the image data input by said input unit.

7. An apparatus according to claim 6, further comprising a storage unit adapted to store the image data in a plurality of forms respective different image quality,
   wherein said second transmission unit transmits the image data each of the plurality of forms.

8. A data communication method comprising:
   a first transmission step of transmitting a URL for specifying additional information to a transmission destination;
   a generating step of generating a markup language file including an object for causing the transmission destination to instruct to print an image corresponding to the additional information;
   a first reception step of receiving a first reply from the transmission destination to the URL transmitted in said first transmission step;
   a second transmission step of transmitting the markup language file including the object generated in said generation step based on the first reply received in said first reception step;
   a second reception step of receiving a second reply from the transmission destination to the markup language file including the object transmitted in said second transmission step; and
   a printing step of printing the image corresponding the additional information based on the second reply received in said reception step to the markup language file including the object transmitted in said second transmission step.

9. A computer readable medium on which is stored a computer executable program for controlling a data communication apparatus said program comprising code for performing the following steps:
   a first transmission step of causing a URL for specifying additional information to be transmitted to a transmission destination;
   a generating step of generating a markup language file including an object for causing the transmission destination to instruct to print an image corresponding to the additional information;
   a first reception step of receiving a first reply from the transmission destination to the URL transmitted in said first transmission step;
   a second transmission step of causing the markup language file including the object generated in said generation step to be transmitted based on the first reply received in said first reception step;
   a second reception step of receiving a second reply from the transmission destination to the markup language file including the object transmitted in said second transmission step; and
   a printing step of printing the image corresponding the additional information based on the second reply received in said reception step to the markup language file including the object transmitted in said second transmission step.

* * * * *

UNITED STATES PATENT AND TRADEMARK OFFICE
CERTIFICATE OF CORRECTION

| | | |
|---|---|---|
| PATENT NO. | : 7,185,053 B1 | Page 1 of 1 |
| APPLICATION NO. | : 09/588495 | |
| DATED | : February 27, 2007 | |
| INVENTOR(S) | : Akihito Mochizuki | |

It is certified that error appears in the above-identified patent and that said Letters Patent is hereby corrected as shown below:

On the Cover page:

Under the heading, "Related U.S. Application Data," on Item (63), please replace "Continuation" with --Divisional--.

In col. 1, line 5, please replace "continuation" with --divisional--.

Signed and Sealed this

Fifteenth Day of May, 2007

JON W. DUDAS
*Director of the United States Patent and Trademark Office*